United States Patent [19]

Raines

[11] 4,310,017

[45] Jan. 12, 1982

[54] BACKFLOW CHECK VALVE FOR USE WITH IV ADMINISTRATION SETS

[75] Inventor: Kenneth Raines, Bethlehem, Pa.

[73] Assignee: Burron Medical Inc., Bethlehem, Pa.

[21] Appl. No.: 116,875

[22] Filed: Jan. 30, 1980

[51] Int. Cl.³ .............................................. F16K 15/02
[52] U.S. Cl. ............................... 137/533; 137/533.17;
137/519; 128/274
[58] Field of Search ............... 137/519, 533, 533.17,
137/843; 128/274, 214 R

[56] References Cited

U.S. PATENT DOCUMENTS

| | | | |
|---|---|---|---|
| 2,919,670 | 1/1960 | Clark, Jr. et al. | 137/533 X |
| 3,758,073 | 9/1973 | Schulte | 128/274 X |
| 3,886,937 | 6/1975 | Bobo et al. | 128/227 |
| 4,005,710 | 2/1977 | Zeddies | 128/274 X |
| 4,103,686 | 8/1978 | Lefevre | 128/214 R |
| 4,222,407 | 9/1980 | Ruschke et al. | 137/843 X |
| 4,244,378 | 1/1981 | Brignola | 128/274 X |

FOREIGN PATENT DOCUMENTS

| | | | |
|---|---|---|---|
| 737249 | 6/1966 | Canada | 128/274 |
| 90274 | 8/1957 | Norway | 137/843 |

Primary Examiner—William R. Cline
Attorney, Agent, or Firm—Shoemaker and Mattare, Ltd.

[57] ABSTRACT

A backflow check valve includes male and female hubs sonically welded together with a flow control disc located within the check valve. The disc permits flow in one direction through the check valve, but prevents flow in the other direction through the check valve.

13 Claims, 3 Drawing Figures

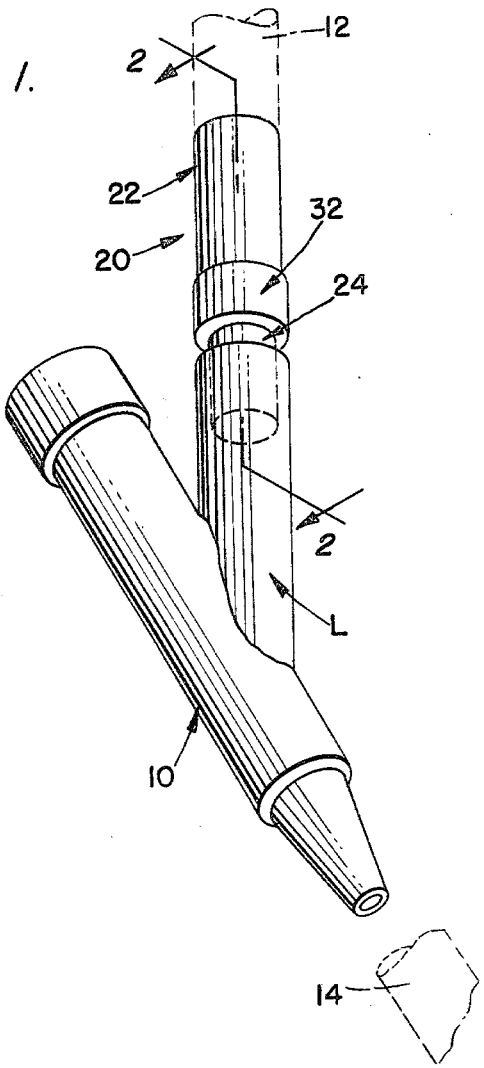
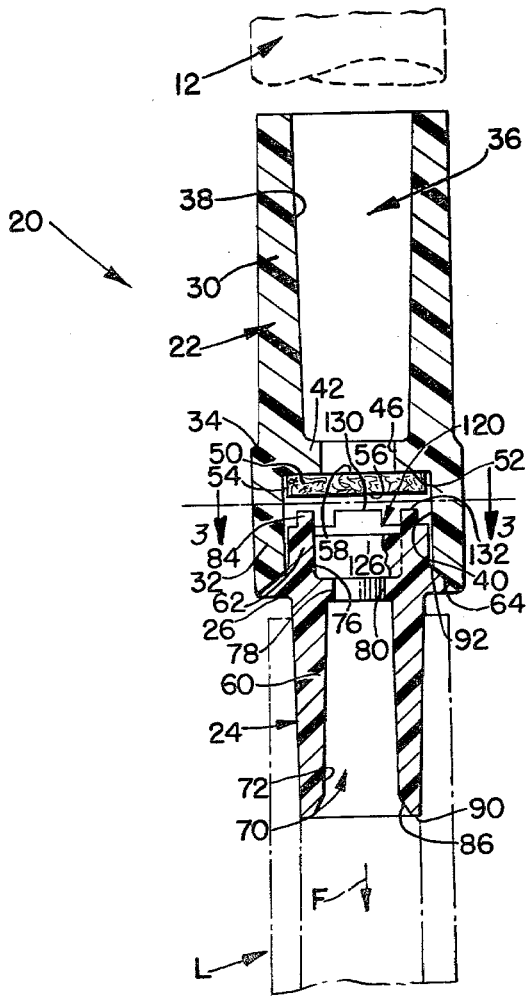
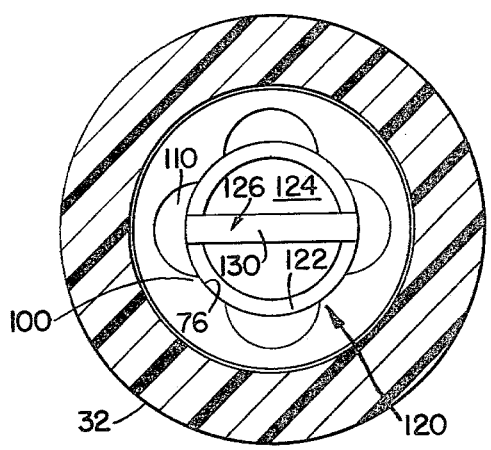

BACKFLOW CHECK VALVE FOR USE WITH IV ADMINISTRATION SETS

BACKGROUND OF THE INVENTION

The present invention relates in general to IV administration sets, and, more particularly, to a backflow check valve for use in IV administration sets.

There are several devices presently available which concern IV administration sets. An example of such devices is shown in U.S. Pat. No. 3,886,937.

However, these known devices usually include a check valve which is expensive and not entirely reliable. These problems arise due to the complex nature of any backflow preventing element used in the check valve. Such backflow preventing elements used in the prior art often include legs, spacers, or the like located on the surfaces of the backflow preventing element. Because of these extra elements on the backflow preventing element, exotic manufacturing techniques are often required, thereby increasing the overall cost of the check valve, while reducing the overall reliability of that check valve.

SUMMARY OF THE INVENTION

The device embodying the teachings of the present invention includes a female hub and a male hub sonically welded together. Flow passages are defined through the hubs to be positioned with respect to each other so that fluid can flow through the device when desired.

A flow control disc is located between the two hubs to permit flow in one direction, but to prevent flow in the other direction, i.e., backflow. The disc is circular in peripheral outline and has unobstructed flat surfaces thereon. A disc abutment means is mounted on the male hub to prevent the disc from becoming dislodged and moving into the male hub flow passage. Flow bypass paths are defined in the male hub element so that flow can bypass the flow control disc when fluid communication between the male and female hub flow passages is desired.

The backflow check valve essentially prevents flow from a primary set until a secondary bottle is emptied when used in conjunction with a Y-injection site.

The control valve of the present invention is easily manufactured by techniques such as simple die cutting, stamping or the like. The check valve disc is preferably rubber, or other substance having a natural resiliency. The natural resiliency produces a positive backflow prevention, thereby further increasing the reliability of the check valve.

The simple form of the backflow preventing element used in this device reduces the overall cost of the check valve considerably from the cost of prior art devices. For example, prior art devices include backflow preventing elements costing two to five times as much as the simple disc included in the presently disclosed check valve.

OBJECTS OF THE INVENTION

It is a main object of the present invention to provide a backflow preventing check valve for use in an IV administration set.

It is another object of the present invention to provide a backflow check valve for use in an IV administration set which is used in conjunction with a Y-injection site means.

It is yet another object of the present invention to provide a backflow check valve for use in an IV administration set which is sonically welded together.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of a portion of an IV administration set which includes the backflow preventing check valve embodying the teachings of the present invention.

FIG. 2 is a view taken along line 2—2 of FIG. 1.

FIG. 3 is a view taken along line 3—3 of FIG. 2.

DETAILED DESCRIPTION OF THE INVENTION

Shown in FIG. 1 is a Y-injection site means 10 inserted between tubing 12 and tubing 14 with a backflow preventing check valve 20 connecting tubing 12 to the injection site 10.

The backflow check valve is the subject of the present disclosure, and is best shown in FIG. 2 to include a female hub 22 and a male hub 24. The hubs 22 and 24 are connected together by a sonic weld 26.

The female hub includes a cylindrical trunk section 30 and a cylindrical coupling section 32 having an outer diameter larger than the outer diameter of the trunk section to define a shoulder 34 at the intersection of these two sections. A bore 36 is defined longitudinally of the hub 22 to define a female luer taper 38. The coupling section 32 has a cylindrical bore 40 defined longitudinally thereof which has an inner diameter larger than the inner diameter of the bore 36 located adjacent the bore 40. A circular shoulder 42 is defined at the discontinuity formed at the intersection of the two bores 36 and 40, and a port 46 is defined centrally through the shoulder 42 to fluidly connect the two bores 36 and 40 together.

A circular flow control disc 50 rests on upper surface 52 of the shoulder 42 and has an outer diameter slightly smaller than the outer diameter of the bore 40 to define an annular gap 54 between these two elements. Preferably, the disc 50 is rubber having a specific gravity of about 0.98. A specific gravity of less than one permits the dic to float upward into the FIG. 2 occluding position, thereby aiding the closing of the check valve when flow is in the wrong direction.

The disc 50 has smooth, unobstructed first and second surfaces 56 and 58, respectively, and is essentially circular in peripheral outline. Such a shape permits easy manufacture as by stamping, die cutting, or the like, thereby providing a check valve which is far less costly than prior art devices which include flow blocking elements having legs, or other such elements on the surfaces thereof. Such prior art blocking elements having legs, and the like, are difficult to manufacture and hence expensive and not as reliable as the disc 50.

The male hub 24 includes a cylindrical trunk section 60 and a cylindrical coupling section 62. A sealing shoulder 64 surrounds the hub adjacent the intersection of the trunk and coupling sections 60 and 62. The sealing shoulder is sonically welded to the female hub coupling section to form the sonic seal 26.

A bore 70 is defined longitudinally of the trunk section 60 and is tapered to form a male luer taper 72. A cylindrical bore 76 is defined longitudinally of the coupling section 62, and has an inner diameter larger than the inner diameter of that part of the luer taper 72 located adjacent the coupling section to define a shoulder 78 at the intersection of the two bores 70 and 76. A port 80 is defined through the shoulder 78 to fluidly couple the bores 70 and 76 together.

A cylindrical skirt portion 84 is located on the lowermost portion of the male hub 24, and a tapered portion 86 is located adjacent outer rim 90 of the hub 24.

As shown in FIG. 2, the outer diameter of the coupling section 62 is less than the inner diameter of the coupling section bore 40 to define an annular gap 92 between those two coupling sections. The tubing 12 is attached to the female hub 22, and a leg L of the Y-injection site 10 is coupled to the male hub 24.

A plurality of ribs 100 are defined on the coupling section skirt portion 84 to extend longitudinally of the male hub 24. As best shown in FIG. 3, the ribs are spaced apart circumferentially about the bore 76, and define flow passages 100 therebetween.

A disc seating member 126 is attached to the male hub and extends across the male hub flow passage and is sized to seat the disc thereon. The seating member 126 encloses an open area 124 therein. The seating member has a disc abutment surface 130 thereon. The surface 130 contacts first surface 56 of the disc 50 when fluid flows through the check valve in the direction of arrow F in FIG. 2 with sufficient force to move the disc from the occluding position shown therefor in FIG. 2 into abutting contact with the male hub. The disc abuts seating member 120 and is thus prevented from being forced into the bore 76 by the fluid passing from the female hub into the male hub in the flow direction F. When the disc abuts the male hub, fluid flows through the flow passages 100 to bypass the disc. However, when the fluid flow is in the direction opposite to the arrow F, the disc 50 abuts the shoulder 42 and occludes the port 46 and the bore 36 to prevent backflow of fluid from the male hub into the bore 36 and hence into the tubing 12 via the valve 20. The FIG. 2 position is thus a closed position for the check valve 20, however, in an IV application, the valve is normally open.

When fluid flow is in the direction indicated by the arrow F, the disc 50 is moved against the male hub and the seating member 120. Fluid flows from port 46 longitudinally of the coupling section 32, then radially of that section when in contact with the disc second surface 58, then longitudinally of the coupling through the gap 54, then generally radially of the disc and coupling along the first surface 56 of the disc through bypass means 100. The fluid moves through open area 124 of the seating member 120, then moves longitudinally of the male hub through the port 80 and into the leg L.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:
1. A backflow check valve for use with IV administration sets comprising:
   a female hub having a flow passage defined therethrough and a valve seat defined in said female hub;
   a male hub having a flow passage defined therethrough and a coupling section thereon, said flow passages being positioned so that fluid communication can be established therebetween;
   a sonic weld connecting said male and female hubs together;
   a flow control disc movably located within said female hub flow passage and movable from a first position seated on said valve seat occluding said female hub flow passage to prevent backflow of fluid from said male hub to said female hub flow passage to a second position in which the entire disc is spaced from said valve seat permitting flow of fluid from said female hub to said male hub;
   disc abutment means on said male hub for preventing a disc from moving into said male hub flow passage, said abutment means being spaced from said valve seat so that said disc traverses a gap before abutting said abutment means, said abutment means including a plurality of skirt members spaced apart circumferentially around said male hub flow passage and extending longitudinally of said male hub, and a cross rib attached to said male hub and extending across said male hub flow passage said cross rib being spaced longitudinally from said skirt members; and
   disc flow bypass means on said male hub for permitting fluid to flow from said female hub flow passage through said gap and past said disc and into said male hub flow passage, said bypass means including spaces between said skirt members fluidly connecting said male hub flow passage to said female hub flow passage so that fluid can bypass said flow control disc when said disc is seated on said skirt members.

2. The check valve defined in claim 1 wherein said bypass flow paths are arcuate in transverse cross-section.

3. The check valve defined in claim 1 wherein said female hub further includes a trunk section and a coupling section with said sections each having a bore defined therethrough, and a shoulder located between said bores, said shoulder having a port defined therethrough to fluidly connect said female hub bores together.

4. The check valve defined in claim 3 wherein said male hub further includes a trunk section and a coupling section with said sections each having a bore defined therethrough, and a second shoulder located between said male hub bores, said second shoulder having a port defined therethrough to fluidly connect said male hub bores together.

5. The check valve defined in claim 4 wherein said hub trunk section bores are tapered and said coupling section bores are essentially cylindrical.

6. The check valve defined in claim 1 wherein said bypass means further includes a flow passage defined between said disc and said female hub flow passage.

7. The check valve defined in claim 1 wherein said male hub further includes a tapered outlet portion thereon.

8. The check valve defined in claim 1 wherein said male hub further includes a sealing shoulder thereon, said sealing shoulder being connected to said female hub by said sonic weld.

9. The check valve defined in claim 1 further including a flow tube connected to said female hub and a Y-injection site means fluidly connected to said male hub.

10. The check valve defined in claim 1 wherein said disc is circular in outer peripheral shape.

11. The check valve defined in claim 10 wherein said disc has a specific gravity of less than 1.0.

12. The check valve defined in claim 10 wherein said disc has flat, unobstructed upper and lower surfaces.

13. The check valve defined in claim 12 wherein said disc is die cut.

* * * * *